US012791118B2

(12) United States Patent
Ho et al.

(10) Patent No.: US 12,791,118 B2
(45) Date of Patent: Nov. 10, 2026

(54) ROTARY VALVE ACTUATOR AND ASSOCIATED METHOD

(71) Applicant: TY-CROP MANUFACTURING LTD., Rosedale (CA)

(72) Inventors: Dennis Keith Ho, Abbotsford (CA); Stewart Douglas MacDonald, Chilliwack (CA); Grant Andrew McGowan, Calgary (CA); Samit Rajesh Shah, Red Deer (CA)

(73) Assignee: PROPELL (ALBERTA) LTD., Calgary (CA)

( * ) Notice: Subject to any disclaimer, the term of this patent is extended or adjusted under 35 U.S.C. 154(b) by 51 days.

(21) Appl. No.: 18/896,462

(22) Filed: Sep. 25, 2024

(65) Prior Publication Data

US 2025/0102075 A1 Mar. 27, 2025

Related U.S. Application Data

(60) Provisional application No. 63/540,495, filed on Sep. 26, 2023.

(51) Int. Cl.
*F16K 31/52* (2006.01)
*F16K 1/22* (2006.01)

(52) U.S. Cl.
CPC .............. *F16K 31/52* (2013.01); *F16K 1/221* (2013.01)

(58) Field of Classification Search
CPC ...... F16K 31/52; F16K 31/521; F16K 1/2007; F16K 1/221; F16K 31/12; F16K 31/122; F16H 19/04; F16H 55/26; F04C 29/124; F04C 18/16; Y10T 74/20504; Y10T 74/18752; Y10T 74/19767; Y10T 74/1896; Y10T 74/18936; Y10T 74/18928; Y10T 74/18968; Y10T 74/18944
USPC ........................................................ 251/279
See application file for complete search history.

(56) References Cited

U.S. PATENT DOCUMENTS 2,833,511 A * 5/1958 Fletcher .................... F16K 1/24 251/298
3,317,179 A * 5/1967 Willis ................ F16K 31/1635 251/280
3,813,015 A * 5/1974 Armstrong .............. G01F 11/46 222/445

(Continued)

*Primary Examiner* — Craig M Schneider
*Assistant Examiner* — Andrew J Rost
(74) *Attorney, Agent, or Firm* — NORTON ROSE FULBRIGHT CANADA LLP

(57) ABSTRACT

A method and apparatus for actuating rotating valves with fast closing times, high precision, and high force. The invention incorporates a lever arm attached to the valve shaft, accompanied by a housing for one or more cylinder-type linear actuators. A pivot mechanism allows the actuators to comply with movement. Multiple actuators can be attached to the lever arm's shaft, which pivots smoothly with the aid of a bearing. The housing securely bolts to the valve mounting flange, ensuring stability and alignment. A front guard with a position indicator window covers the lever arm, while a rear guard protects the actuators. By enabling longer and shorter strokes than the open and closed positions, multiple actuators can be precisely programmed and synchronized for optimal performance. This approach potentially improves valve actuation, offering enhanced speed, precision, and force for diverse fluid or slurry flow control applications.

7 Claims, 10 Drawing Sheets

(56) References Cited

U.S. PATENT DOCUMENTS

| | | | | | |
|---|---|---|---|---|---|
| 4,180,238 | A * | 12/1979 | Muchow | F16D 19/00 | 251/58 |
| 4,671,310 | A * | 6/1987 | Henninger | F16K 5/0407 | 251/363 |
| 4,945,949 | A * | 8/1990 | Carpentier | B65D 90/66 | 137/613 |
| 5,241,989 | A * | 9/1993 | Kalavitis | F16K 1/2028 | 251/212 |
| 5,542,643 | A * | 8/1996 | Breth | F16K 31/1635 | 251/279 |
| 5,579,801 | A * | 12/1996 | Pye | F16K 31/1635 | 251/279 |
| 6,000,095 | A * | 12/1999 | Johnson | B60S 3/002 | 15/312.1 |
| 11,946,566 | B2 * | 4/2024 | Schifrin | F16K 31/52441 | |
| 2007/0006829 | A1 * | 1/2007 | Abram | F01N 1/165 | 123/90.11 |
| 2015/0076381 | A1 * | 3/2015 | Hughes | F16K 31/122 | 251/188 |

* cited by examiner

ROTARY VALVE ACTUATOR AND ASSOCIATED METHOD

CROSS-REFERENCE TO RELATED APPLICATIONS

This application claims the benefit of priority to U.S. Application No. 63/540,495, filed Sep. 26, 2023, entitled ROTARY VALVE ACTUATOR AND ASSOCIATED METHOD, of which Application is incorporated herein by reference in its entirety. It is understood, however, that in the event of any inconsistency between this specification and any information incorporated by reference in this specification, this specification shall govern.

FIELD OF THE INVENTION

The present invention pertains to the field of fluid control, for example for use in controlling fluid and slurry flows via valves on hydraulic fracturing blender units or other applications.

BACKGROUND

Rotating valves, such as butterfly valves, play an important role in fluid and slurry control for numerous industries and applications. Efficient actuation methods for valves are thus desirable. Traditional approaches predominantly rely on rotary actuators, in which a rotary motor is positioned above the valve shaft and acts to move the valve shaft, for example in response to an electrical control signal. While rotary actuators serve many purposes effectively, they are subject to improvement. In particular, conventional rotary valve actuators may be limited in terms of their actuation speed, amount of force that can be applied to actuate the valve, and the level of precision to which controlled actuation is possible in an automated environment. Such limitations can be particularly noticeable in applications where fluids or slurries are subjected to high pressures, for example of about 100 PSI or more. Such limitations may further be relevant in demanding applications such as controlling fluid or slurry flows aboard hydraulic fracturing blender units, which have specific speed and force requirements to prevent the overflowing of the blending tub.

Therefore, there is a need for a valve actuator that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a rotary valve actuator and associated method. In particular, embodiments provide for a method and apparatus for actuating rotating valves such as but not necessarily limited to butterfly valves. One or more linear actuators are operated to move a lever arm attached to the valve's rotary shaft which controls its open/closed state. An illustrative embodiment combines a lever arm, housing, pivot mechanism, shaft, bearing, front guard with a position indicator, rear guard, and a particular stroke layout. Embodiments may provide for desirably fast valve closing times, desirably high precision, and desirably high force, potentially improving fluid and slurry control.

In more detail, in various embodiments, a lever arm, attached to the valve shaft, is pivotable, while the housing accommodates one or more linear actuators, allowing compliance with movement through the pivot mechanism. The lever arm's shaft can attach multiple actuators, facilitated by a smooth-pivoting bearing. The system is securely bolted to the valve mounting flange for stability. Front and rear guards provide protection, and the stroke layout enables software programming and synchronization of multiple actuators for relatively precise control and programmable stops. Embodiments may provide desirably adequate automated valve control performance for a variety of applications, such as in hydraulic fracturing and other scenarios requiring quick response times, high force capabilities, and compact design.

According to embodiments of the present invention, there is provided an actuator for a rotary valve, comprising a lever arm and one or more linear actuators. The lever arm is coupled to a shaft of the valve at a first location. The shaft is rotatable between a valve closed position and a valve opened position. The lever arm extends from the first location to a second location spaced apart from the first location. The second location can be radially outward, relative to the shaft and its rotational axis, from the first location. The one or more linear actuators are pivotably coupled to the lever arm at the second location and configured to impart force on the lever arm to cause rotation of the shaft in response to extension, retraction, or both extension and retraction of the one or more linear actuators. The linear actuators extend from the second location to a third location and the linear actuators are pivotably anchored to a base or housing at the third location. The linear actuators may extend in a direction generally perpendicular to the shaft and its rotational axis. The base or housing is immobile with respect to the rotary valve.

In some embodiments, the one or more linear actuators include a first linear actuator coupled to a first portion of a lever arm actuator shaft, the portion extending upward from the lever arm and a second linear actuator coupled to a second portion of the lever arm actuator shaft, the second portion extending downward from the lever arm.

In some embodiments, the first linear actuator is non-rotatably coupled to the first portion of the lever arm actuator shaft, the second linear actuator is non-rotatably coupled to the second portion of the lever arm actuator shaft, and the first portion of the lever arm actuator is integrated with or non-rotatably coupled to the second portion of the lever arm actuator shaft.

In some embodiments, each or at least one of the one or more linear actuators is operable to travel in a limited range between a fully retracted position and a fully extended position, such that one or both of the following conditions hold. The valve is in the opened position when at least one of the linear actuators is at a first position between the fully retracted position and the fully extended position. Additionally or alternatively the valve is in the closed position when said at least one or another at least one of the actuators is at a second position between the fully retracted position and the fully extended position. The fully extended position and fully retracted position may correspond to positions that the linear actuator could achieve if not integrated into the apparatus.

In some embodiments, a length, shape, or both length and shape of the lever arm is configured to provide a predetermined performance for the actuator, the performance including one or more of: torque performance, speed performance, and positioning precision performance.

In some embodiments, the lever arm is adjustable in length, shape or both length and shape or replaceable with another lever arm of different length, shape, or both length and shape, in order to adjust performance for the actuator.

In some embodiments, the apparatus (actuator) further includes a pivoting actuator bracket holding the one or more linear actuators and being pivotably anchored to the base or housing, the one or more linear actuators being pivotably anchored to the base or housing via the pivoting actuator bracket.

In some embodiments, the apparatus (actuator) further includes a lever arm stop which is stationary relative to the base or housing, and which is configured to engage and halt the lever arm when the lever arm reaches a predetermined position effecting the valve closed position or the valve opened position.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
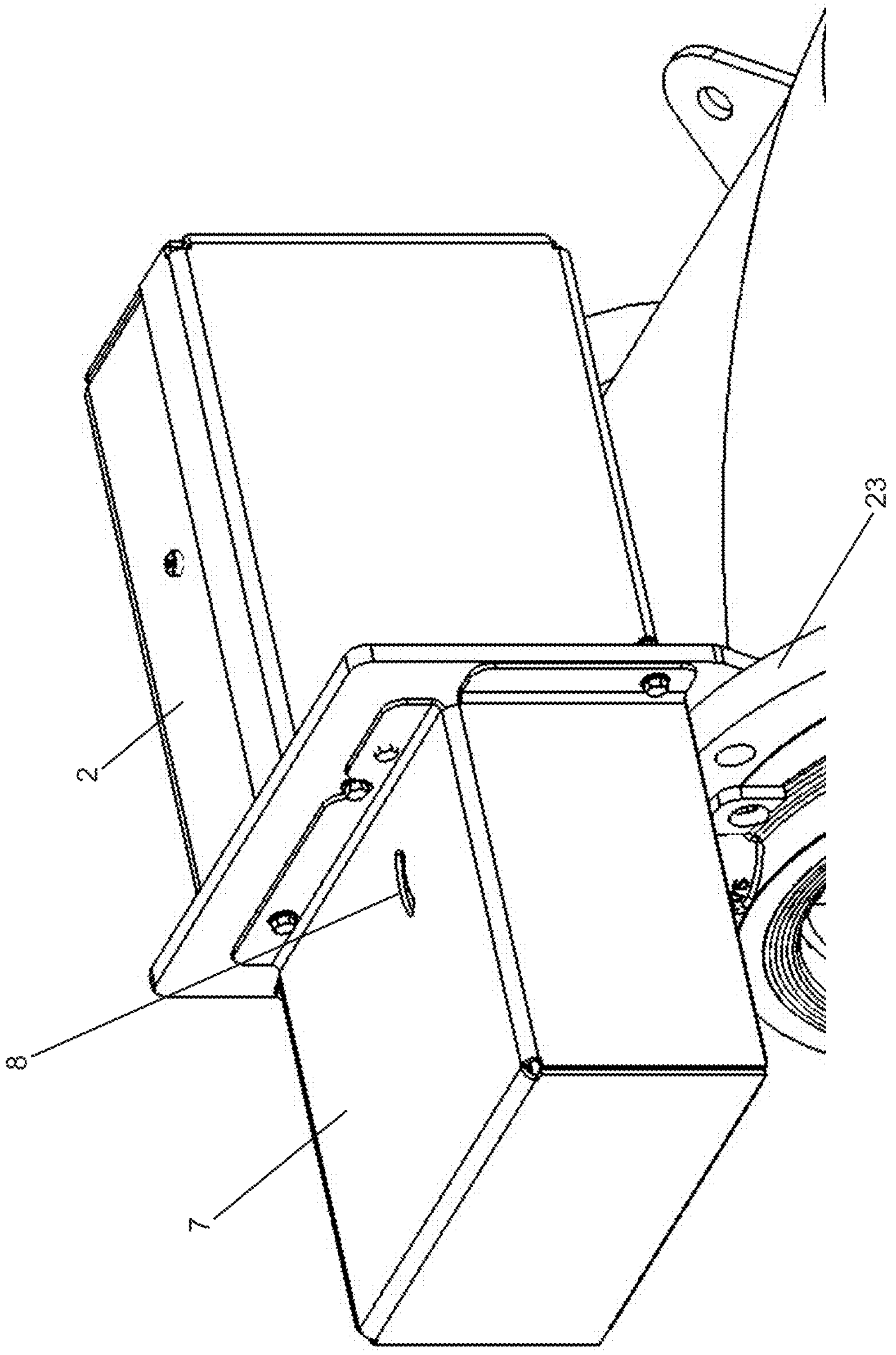
FIG. 1A shows a valve actuator with outer casing, according to embodiments of the present invention.
Figure 1B:
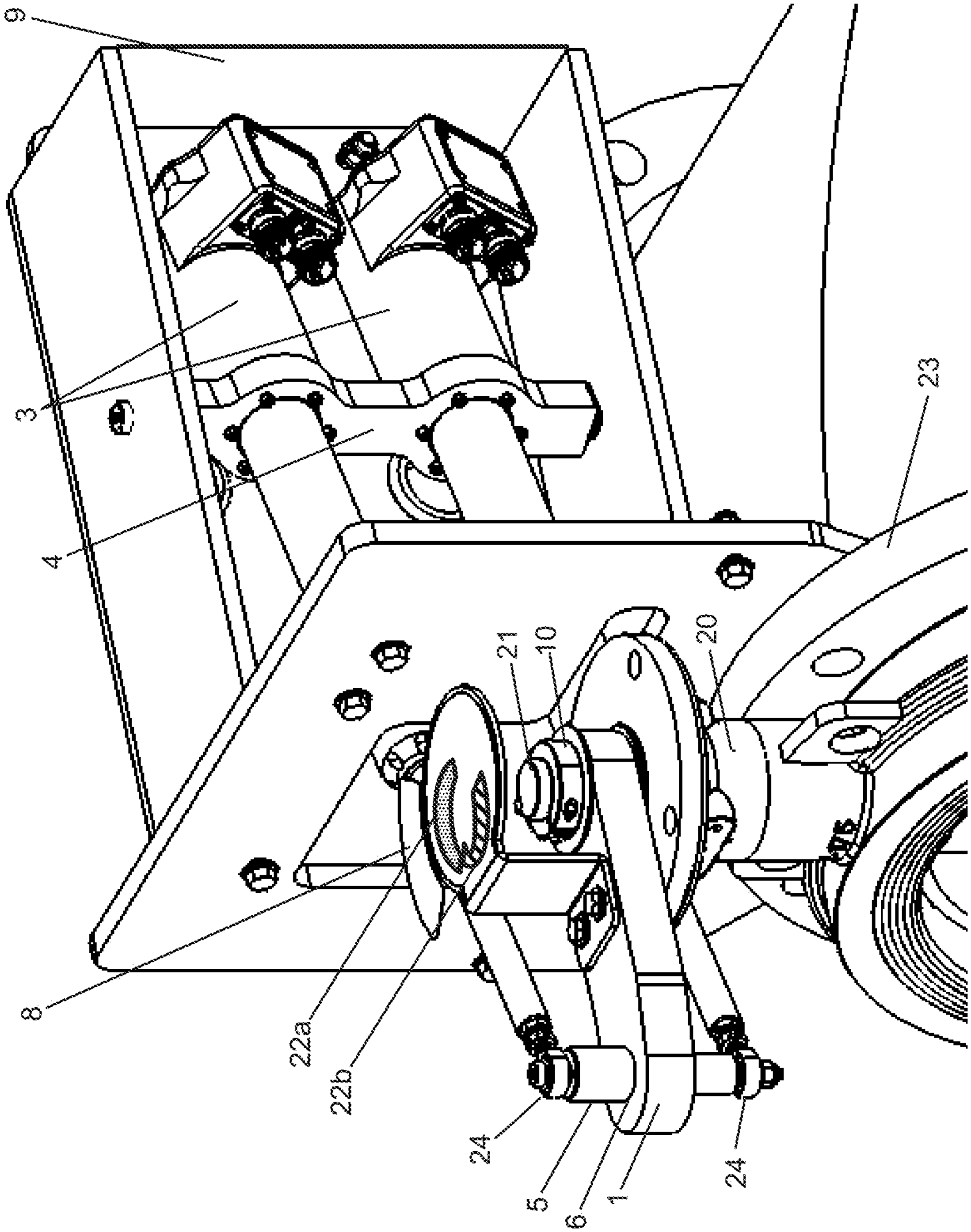
FIG. 1B shows the valve actuator of FIG. 1A in the open position, with two linear actuators, and a locking collar to retain the lever assembly to the valve shaft, according to embodiments of the present invention.

Unless defined otherwise, all technical and scientific terms used herein have the same meaning as commonly understood by one of ordinary skill in the art to which this invention belongs. The numbers and numbers combined with letters correspond to the component labels in all the figures.

Embodiments of the present invention provide for a rotary valve actuator with certain features and capabilities. The actuator uses one or more linear actuators to push a lever which is coupled to the rotational control shaft of the valve. The linear actuators may be controlled for example by an automatic control system with precise timing.

Embodiments may address certain limitations of existing rotary valve actuators, for example by facilitating adequate or enhanced performance in terms of speed, force, and precision control. Embodiments may facilitate faster valve closing times when compared with conventional rotary actuators. This may allow for an adequately swift response to commands and dynamic conditions. As such, embodiments may be particularly useful in applications such as hydraulic fracturing blenders. Embodiments may provide the ability to actuate (open or close) a valve with high force, and this may be leveraged to provide effective valve control even under challenging scenarios, for example where fluid and slurry being directed may be subjected to high pressures, including upwards of 100 PSI. Furthermore, embodiments may be designed to meet a specific trade-off between actuation force and speed that is required in certain applications. Whereas ordering a rotating actuator to meet the exact required specifications for an application may be expensive or require long lead times, this design is more readily adaptable to meet specific speed and force requirements.

Notably, some embodiments of the invention utilize multiple linear actuators, facilitating a compact design compared to the use of a single actuator for achieving similar or greater force and speed. For example, two smaller, lower-strength linear actuators can be used in parallel, rather than one larger, higher-strength linear actuator which has a larger overall footprint than the two smaller linear actuators. This compactness may allow for conserving space on mobile equipment or other applications where size constraints are important. Typical linear actuators, including ball-screw electric type actuators, are mass produced, readily available, and inexpensive.

Due to versatility, embodiments of the present invention may allow adaptation to a wide variety of linear actuators, potentially offering flexibility and compatibility across different systems and configurations. Accordingly, embodiments may demonstrate the potential to improve fluid and slurry control mechanisms across various industries, potentially contributing to greater operational efficiency and performance.

Considering the importance of fluid and slurry control in diverse applications, such as hydraulic fracturing, embodiments potentially provide for a significant step forward, addressing the need for faster valve actuation response times, higher force capabilities, precise control, and compact form factor in the field of rotating valve actuation.

An illustrative embodiment will now be described, with respect to FIGS. 1A to 6. The following description provides an overview of such an embodiment, providing a method and apparatus for actuating a rotating valve. As will be appreciated, embodiments may potentially offer various benefits such as improved speed, precision, and force for applications such as fluid or slurry control applications. This description encompasses the various elements and their potential combinations, but not all embodiments of the invention may incorporate each feature listed.

The following major components are described below and illustrated in FIGS. 1A to 6. Some or all of these components may be included in any particular embodiment:

Lever arm 1;
Actuator housing 2;
Linear actuator(s) 3;
Pivoting actuator bracket 4;
Lever arm actuator shaft 5;
Shaft bearing 6;
Front guard 7 with position indicator window 8;
Rear actuator guard 9;
Lever arm retainer 10;
Lever arm stop 11;
Valve 20;
Valve shaft 21;
Indicator 22*a*, 22*b;*
Valve mounting flange 23;
Actuator to shaft coupling locations 24;
Bracket 25 mounted to valve shaft flange.

The actuation system includes a lever arm 1 that is attached to the shaft 21 of the rotating valve 20 and extends perpendicular from the lengthwise direction of the shaft 21. Thus the lever arm 1 extends away from the axis of rotation of the shaft 21. This lever arm 1 serves as a pivotal component for transmitting force and movement and acts as a force multiplier. The lever arm also incorporates an indicator, collectively 22*a*, 22*b* to convey the status of the valve position. Indicator portion 22*a* may indicate an open status, while indicator portion 22*b* may indicate a closed status. In some embodiments of the invention, this indicator may be viewed through a window 8 in the top, and/or side of the front guard 7. One end of the lever arm 1 connects to the valve shaft 21, while the opposite end is connected to a lever arm actuator shaft 5 or similar extension. In some embodiments, this lever arm actuator shaft 5 or extension may be free to rotate. For example, this lever arm actuator shaft 5 or extension may be coupled to the lever arm 1 via a bearing assembly. The lever arm extends radially outward from an axis about which the shaft 21 rotates.

As will be readily understood by a worker skilled in the art, the valve 20, being a rotary valve, is operated by rotation of the shaft 21, so that the valve is closed when the shaft is rotated to a corresponding valve closed position and the valve is opened when the shaft is rotated to a corresponding valve opened position. In some cases, the valve may be partially opened when the shaft is rotated to a corresponding intermediate position.

The length, shape, or both length and shape of the effective lever can be tailored to the application, balancing requirements for actuation speed and torque, possibly along with other requirements such as precision of control over the valve's open/closed state, as well as actuator size itself. For example a smaller actuator may be viewed as having higher performance due to it being more readily incorporated into tight spaces. In some embodiments, the lever arm length may be adjustable, or the lever arm may readily be swapped out for an arm with a different length. The housings and guards (see below) may similarly be swapped or adjustable, or the housing may be large enough to accommodate multiple sizes of lever, linear actuator, or the like.

For example, a longer lever arm allows for higher torque to be applied to rotate the valve toward the open or closed position, as well as a more precise control over the valve's rotary position assuming a same linear actuator positional precision. A shorter lever arm can provide for higher opening/closing speed assuming a same linear actuator speed.

Figure 2A:
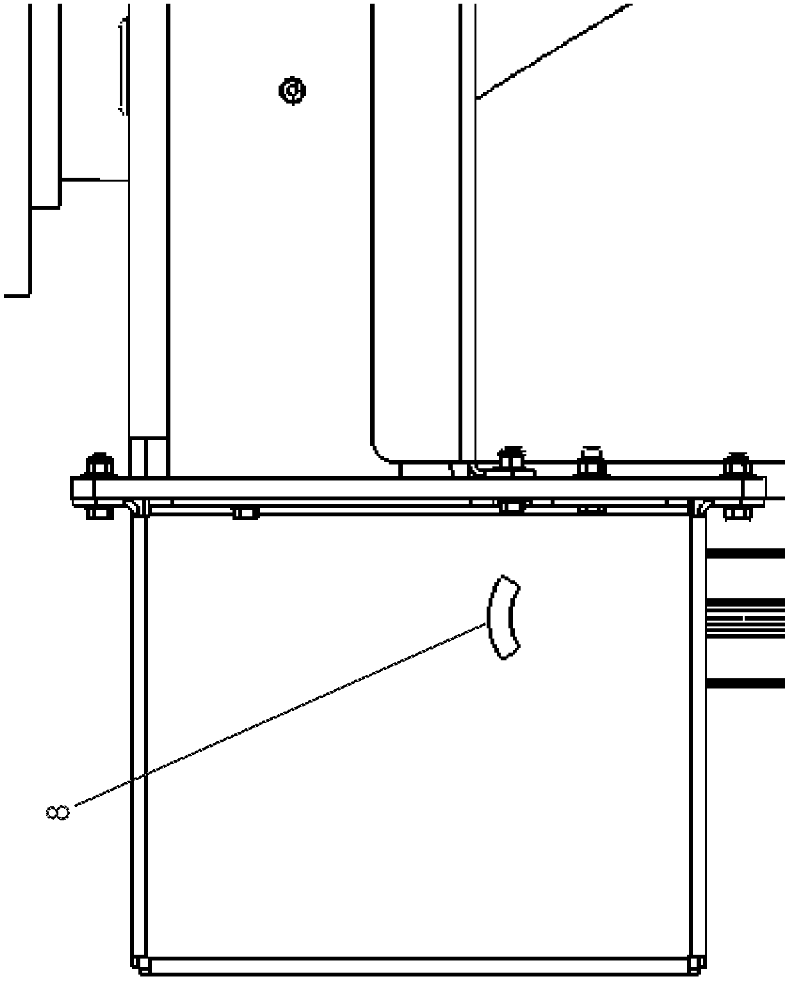
FIG. 2A shows a top-down view of the valve actuator of FIG. 1A, with outer casing.
Figure 6:
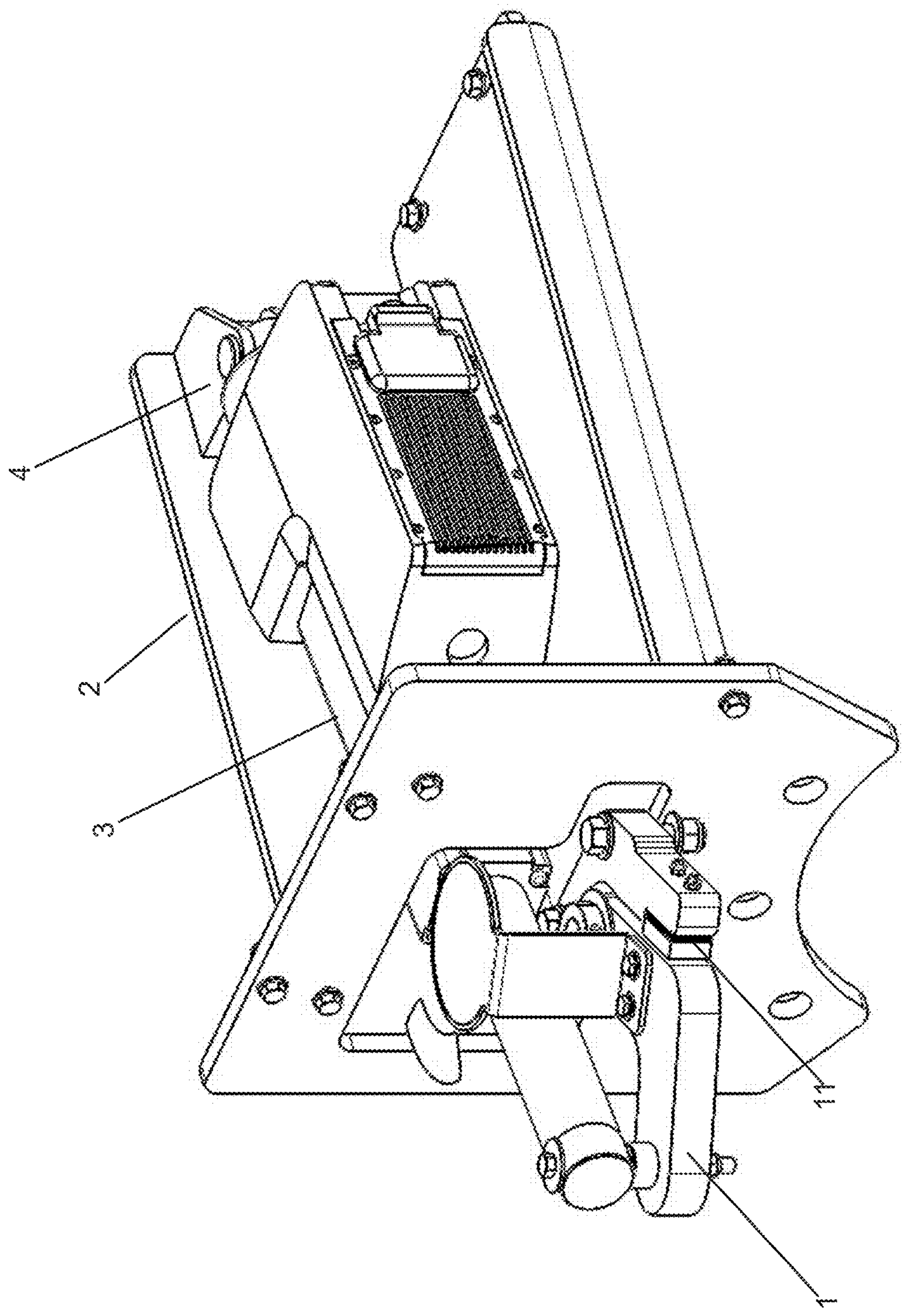
FIG. 6 shows a valve actuator with only one actuator and an adjustable hard stop to inhibit overtravel of the valve actuator and valve, according to embodiments of the present invention.

The lever arm 1 may be bent or curved as illustrated most notably in FIG. 2 and FIG. 6. Such a bend may be included to provide clearance around the valve shaft, while limiting or minimizing the overall footprint of actuator.

The shape of the lever arm can be adjusted for example so that it does not contact certain other components. For example, as noted above the lever arm may be bent or curved. For a bent or curved lever arm, the effective length of the lever arm may be considered to be the distance between the axis of rotation of the shaft 21 and the locations (e.g. 24) at which the actuators couple to the lever arm.

Attached to the valve 20 is a housing 2 designed to accommodate one or more linear actuators 3, which are pivotably mounted using a pivoting actuator bracket 4 mechanism. The housing 2 is sufficiently strong to support the components of the valve actuator. The housing 2 may have mounting points for the front guard 7 and a rear actuator guard 9, as well as mounting points for the pivoting actuator bracket 4. Some embodiments of the invention may include bearings for the pivoting actuator bracket 4, which may be integrated into the pivoting actuator bracket, or the housing 2, or both. For stability and alignment, the housing 2 may be securely bolted to the valve mounting flange 23 by utilizing the mounting holes on the flange. This provides for the actuation system remaining robust and firmly fixed during operation, inhibiting unwanted movement or misalignment that may compromise the valve's performance. As well, it utilizes the existing valve structure for mounting, without the need for additional external bracing or support. Other devices for anchoring the housing relative to the valve may also be used.

One or more linear actuators 3 may be used to actuate the valve 20. Two linear actuators may offer advantages, such as generally equal (balanced) loading on either end of the lever arm actuator shaft 5, as well as a more compact size for a similar or improved actuation force and speed compared to a single actuator. Two linear actuators may provide for two substantially balanced forces acting on the opposite ends of the lever arm actuator shaft 5, thus improving design and operation. An even number of linear actuators may provide for similar characteristics. In some embodiments of the invention, these linear actuators are electrically driven cylinder-type actuators utilizing a ball-screw design. In other embodiments, the linear actuators may be driven pneumatically or hydraulically, or be of a different type. The linear actuators may be controlled by an automatic control system (e.g. PID or other computerized controller) to operate the valve at desired times, with the application potentially requiring a precise timing of operation and therefore limited or minimal actuation delay.

Notably, the pivoting actuator bracket 4 facilitates the linear actuators 3 to readily comply with the movement of the lever arm 1, allowing for efficient valve actuation, while also retaining the actuators above the pivot point of the bracket 4. That is, the end of the lever 1 will move in an arc as the valve is operated, causing the ends of the linear actuators connected thereto to also move. To keep the linear actuators straight, they are required to change in angular orientation, and the pivoting actuator bracket allows such a change. The pivoting actuator bracket is mounted to the actuator housing 2 and can freely rotate at least within a limited range. The pivoting actuator bracket 4 captures the linear actuators 3, allowing them to rotate about only one axis (vertical axis), and preventing movement about any other axis. The linear actuators 3 may be attached to this bracket 4 in a variety of ways, such as directly fastened via bolts. Although the linear actuators 3 are shown as being coupled to the bracket 4 at a location partway along their length, they may alternatively be coupled to the bracket 4 at their extreme end. In various embodiments, as illustrated, the same lever arm bracket holds multiple linear actuators. The lever arm bracket (as illustrated) may be such that both linear actuators are constrained to have the same angular position. In other embodiments, different linear actuators may be allowed to have different angular positions, e.g. by being mounted to different independently pivotable portions of the same lever arm bracket, or by being mounted to different lever arm brackets.

A lever arm actuator shaft 5 or similar extension is attached or coupled to the lever arm 1, providing a means to attach the one or multiple linear actuators 3. The shaft 5 is attached to the lever arm 1 at the opposite end of the lever arm than its attachment to the valve shaft 21. The shaft 5 in the illustrated embodiment extends in a direction which is parallel to the axis of rotation of the valve shaft 21 and lever arm 1. The lever arm actuator shaft 5 allows for the attachment of the actuated portion of one or more linear actuators 3. The physical arrangement of the components may allow for enhanced control and force distribution across the valve. The lever arm shaft may be omitted in some embodiments, in which case the linear actuator(s) 3 may be directly pivotably coupled to the lever arm 1.

In some embodiments, the inclusion of two linear actuators coupled respectively to lever arm shaft portions extending upward and downward from the lever arm allows for a more balanced application of force to the shaft portions. For example, this allows for force to be applied without or with less force that would tend to twist the lever arm and associated shaft. The use of multiple actuators, with adequate power, may also provide for at least a degree of redundancy, for example in the case of failure of one of the actuators.

The linear actuators 3 extend from a location at which they are attached to the bracket 4 (or other anchoring device) to another location at which they are attached to the lever arm 1 or lever arm actuator shaft 5. The linear actuators extend in a direction which may be generally perpendicular to the shaft 5 and its axis of rotation.

To facilitate smooth pivoting and movement of the above-mentioned lever arm actuator shaft 5, a shaft bearing 6 may be provided, for rotatably coupling the shaft 5 to the lever arm 1, while facilitating limited to minimal friction and desirable to optimal performance. The shaft bearing 6 facilitates the lever arm 1 and the attached actuators 3 in rotating smoothly and reliably as the lever arm pivots and the actuators move in response to the pivot. The bearing 6 may be a ball bearing, self-lubricating bearing, or other device to reduce friction and wear. The entire shaft 6 may rotate within a bearing, or just a portion of the shaft where the actuator(s) connects to it may rotate. Additionally or alternatively, bearings may be provided which rotatably couple the shaft 6 to the actuators 3, for example at locations 24.

In some embodiments, multiple linear actuators are rotationally coupled together at their ends which couple to the lever arm. For example, referring to FIG. 1, the upper and lower linear actuators 3 are non-rotatably coupled to the actuator shaft 5, e.g. by a fixed rigid coupling. The actuator shaft 5 is then pivotably coupled to the lever arm 1 via a shaft bearing 6. This provides a tighter coupling together of the two linear actuators, as they are both positionally coupled (to extend and retract together so that their ends vertically align with the actuator shaft 5), and rotationally coupled (to rotate together due to their ends being fixed with respect to one another). This arrangement (which can be extended to multiple actuators) forces the actuators to work (e.g. exactly) in tandem, inhibiting or preventing any "chattering" or otherwise having the actuators fight each other. In the above arrangement, it is noted that the upper and lower portions of the lever arm actuator shaft are configured to rotate together, e.g. by being formed of a single unitary body. Accordingly, in various embodiments, multiple linear actuators are non-pivotably coupled to a same (pivotable) lever arm actuator shaft at respective actuator ends.

In view of the above, the linear actuators are pivotably coupled to the lever arm, either directly or via a lever arm actuator shaft. Movement (extension or retraction) of the linear actuators imparts a force to the lever arm in order to move the lever arm, and hence cause rotation of the shaft.

To facilitate safety and a clean operating environment, a front guard 7 may be installed, covering the movement of the lever arm 1 and portions of the actuator(s) 3. This front guard 7 may feature a position indicator window 8, allowing operators to visually monitor the position of the valve 20. The position indicator 22*a*, 22*b* itself is part of or is rigidly attached to the lever arm 1, or is mounted to the lever arm, offering accurate visual feedback on the current state of the valve 20. The position indicator 22*a*, 22*b* as shown is raised above the lever arm and is rigidly attached to the lever arm. When the valve is open, an "open" indication 22*a* on the position indicator aligns with the window 8, while when the valve is closed, a "closed" indication 22*b* on the position indicator aligns with the window.

To safeguard the actuators 3 and internal components, a rear guard 9 is provided. This rear guard provides protection against external elements and potential damage, maintaining the integrity of the actuation system.

A lever arm retainer 10 may be used to retain the lever arm 1 to the valve shaft 21. The lever arm retainer 10 may comprise, consist or consist essentially of a formed part that slides over the top of the valve shaft 21, providing clearance for the valve shaft 21 and lever arm 1 to operate, and attaches to the valve housing to inhibit movement. In another embodiment of the invention, the lever arm retainer 10 may be a collar that attaches to the valve shaft 21 stub portion that extends past (e.g. above) the lever arm 1. The valve shaft will generally be non-circular or keyed, so that the lever arm when fitted over the valve shaft, the lever arm and valve shaft will rotate together.

A lever arm stop 11 (see FIG. 6) may be used to prevent overextending the actuators 3 in the case of a failure or fault. If an actuator 3 is commanded (operated) to extend past the operational range of the valve, or past a prescribed or configurable operational range, the stop will inhibit overtravel of the lever arm 1 and valve 20 and avoid or mitigate potential damage. The lever arm stop 11 may include a bracket which attaches to housing of the valve 20. Lever arm stops can be provided to inhibit overtravel in the valve open (e.g. actuator extended) position, the valve closed (e.g. actuator retracted) position, or both. The lever arm stop also effectively prevents the pivot arm from rotating in the incorrect direction when the linear actuator(s) are retracting. Accordingly, the lever arm stop may be stationary relative to the base or housing, and may be configured to engage and halt the lever arm when the lever arm reaches a predetermined position effecting the valve closed position or the valve opened position.

Figure 2B:
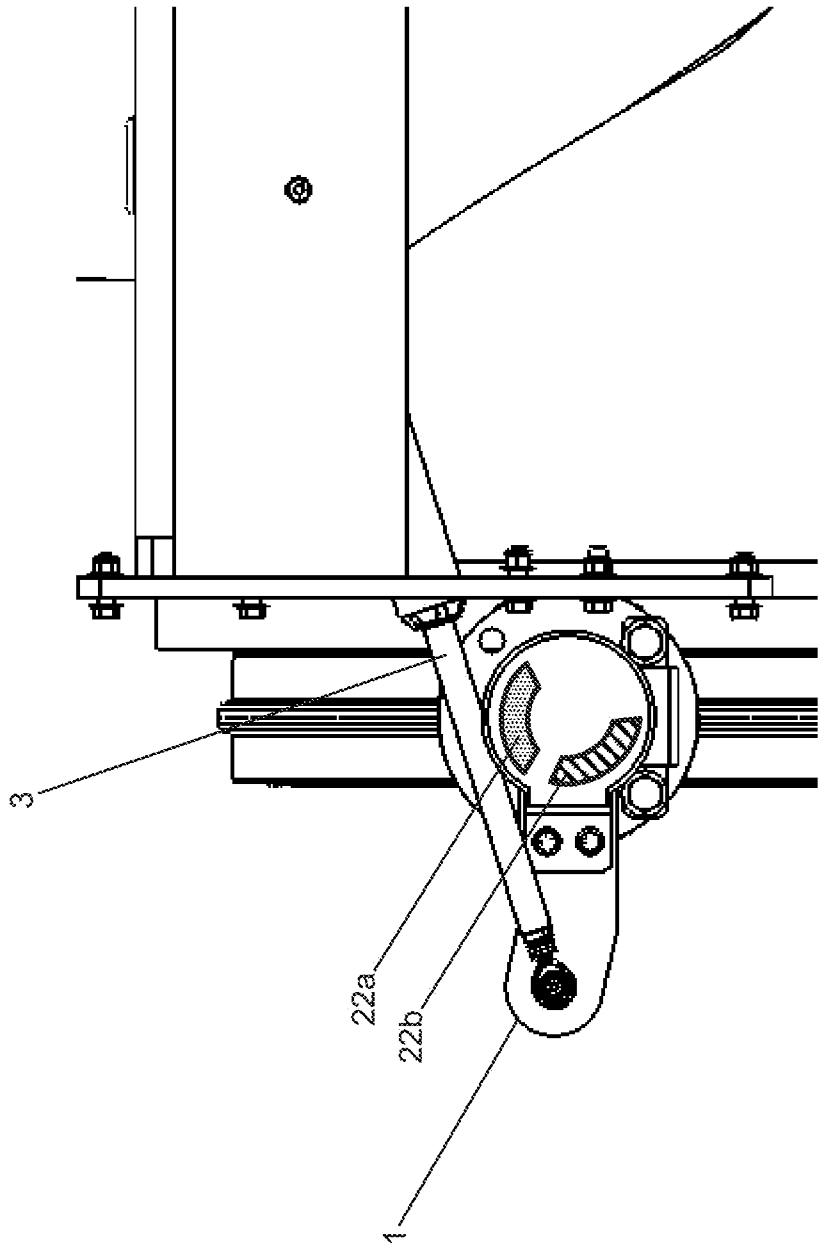
FIG. 2B shows a top-down view of the valve actuator of FIG. 2A, with its lever arm in the open position. The OPEN indicator is visible through a window provided in the lever assembly guard, according to embodiments of the present invention.

As shown in FIG. 2B, the linear actuator(s) 3 is/are extended to pivot the lever arm 1 and the valve into an open position. The position indicator 22*a*, 22*b* is also thereby pivoted so that the OPEN indicator 22*a* is visible through the window 8.

Figure 2C:
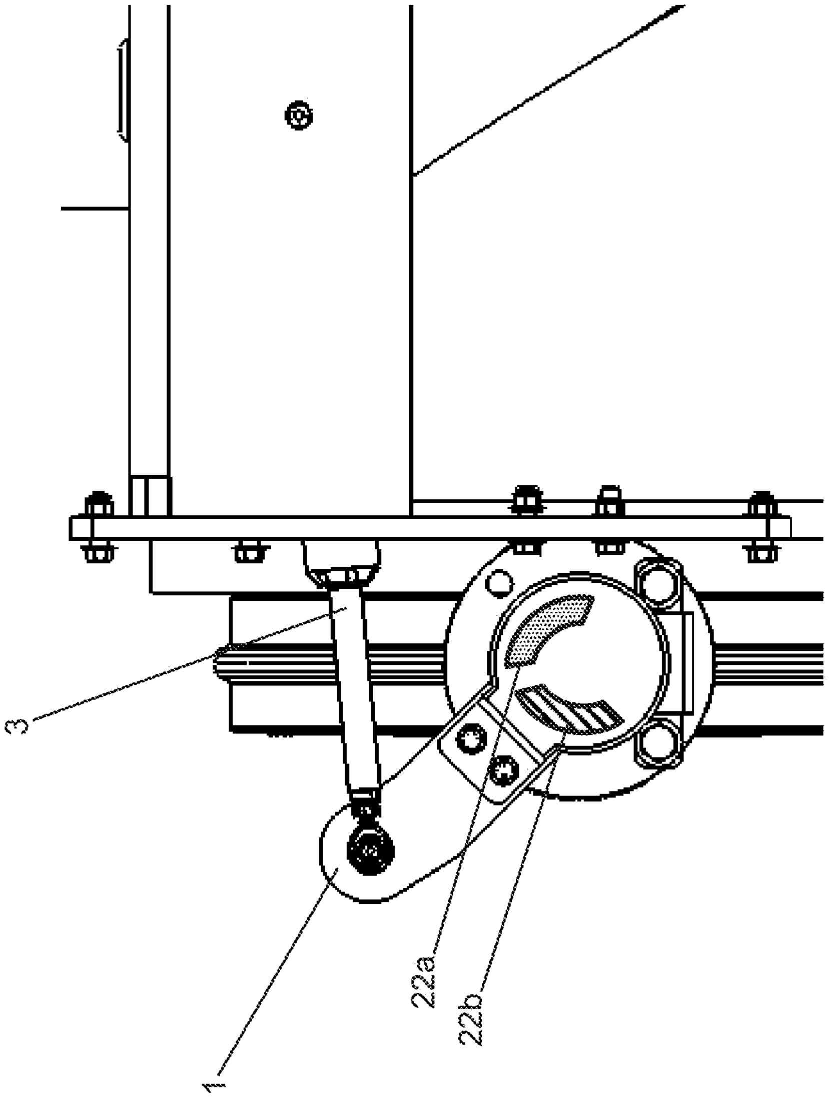
FIG. 2C shows a top-down view of the valve actuator of FIG. 2A, with its lever arm partway between the open and the closed position, according to embodiments of the present invention.

As shown in FIG. 2C, the linear actuator(s) 3 is/are extended to pivot the lever arm 1 and the valve into an intermediate position between the open position and the closed position. The position indicator 22*a*, 22*b* is also thereby pivoted accordingly, potentially with part of the OPEN indicator 22*a* and part of the CLOSED indicator 22*b* both being visible through the window 8.

Figure 3:
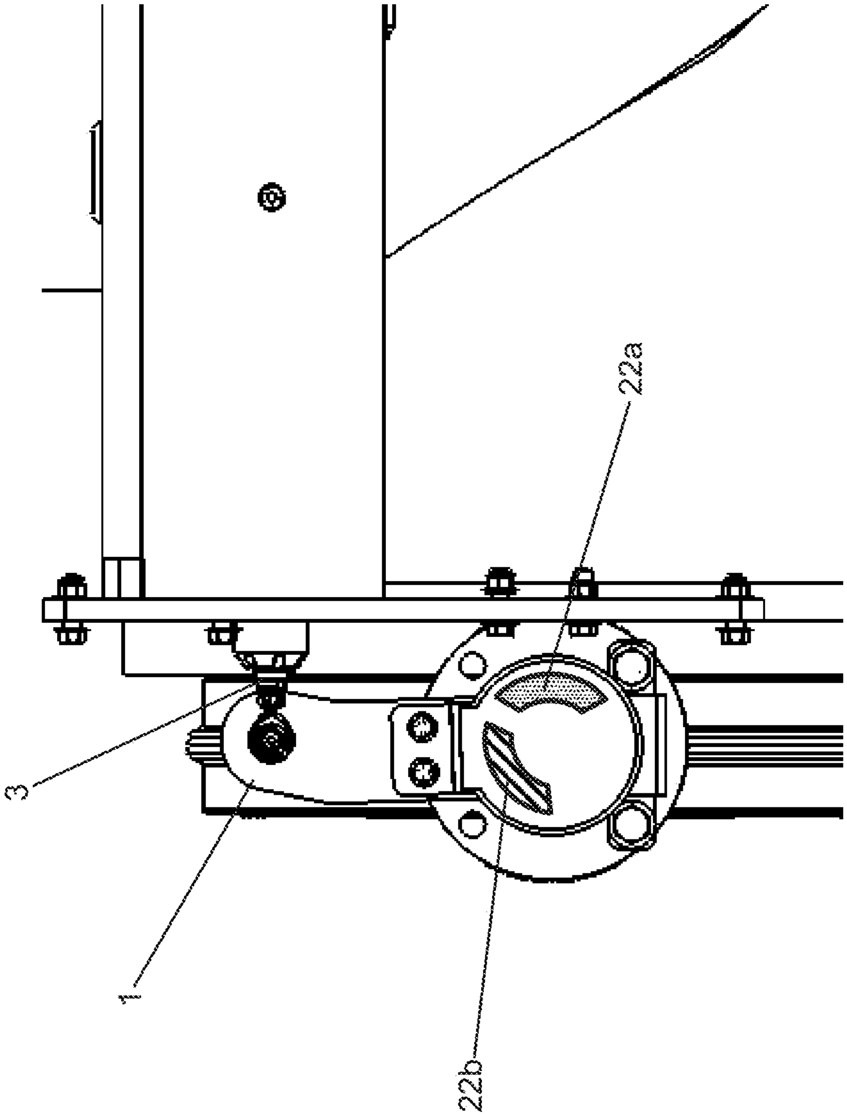
FIG. 3 shows a top-down view of the valve actuator of FIG. 2A, with its lever arm in the closed position. The CLOSED indicator is visible through a window provided in the lever assembly guard, according to embodiments of the present invention.

As shown in FIG. 3, the linear actuator(s) 3 is/are retracted to pivot the lever arm 1 and the valve into a closed position. The position indicator 22*a*, 22*b* is also thereby pivoted so that the CLOSED indicator 22*b* is visible through the window 8.

Figure 4:
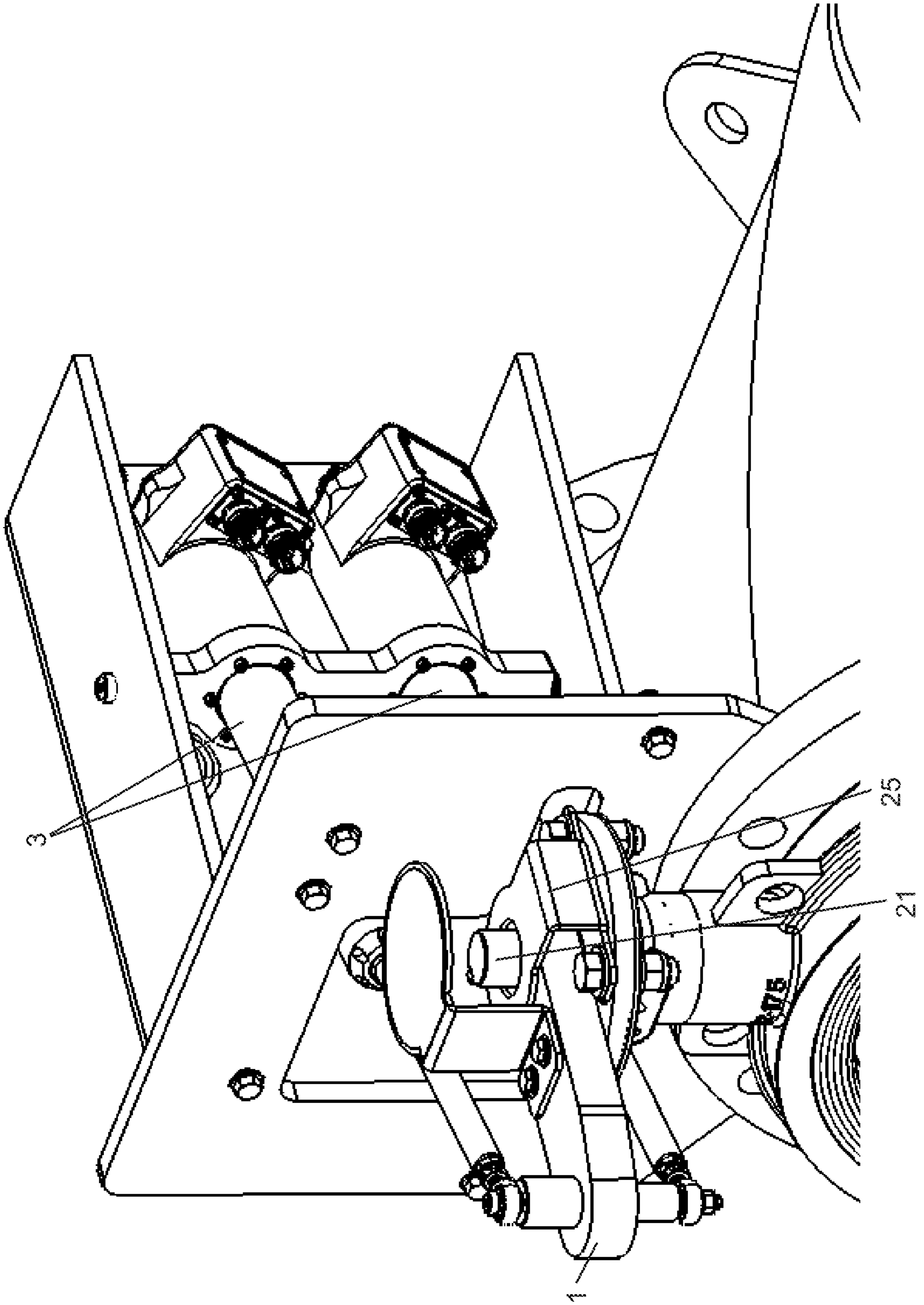
FIG. 4 shows a valve actuator in the open position, with two linear actuators, and an alternative approach to retain the lever assembly to the valve shaft using a bracket mounted directly to the valve shaft flange, according to embodiments of the present invention.

FIG. 4 also shows the valve actuator operated to place the valve in the open position, with two linear actuators 3 extended. The window 8 is visible in more detail. An alternative approach to retain the lever arm 1 to the valve shaft 21 is also shown. This includes a bracket 25 mounted directly to the valve shaft flange. The bracket 25 extends overtop of the lever arm 1, thereby retaining the lever arm 1 in position engaged with the valve shaft 21.

Figure 5:
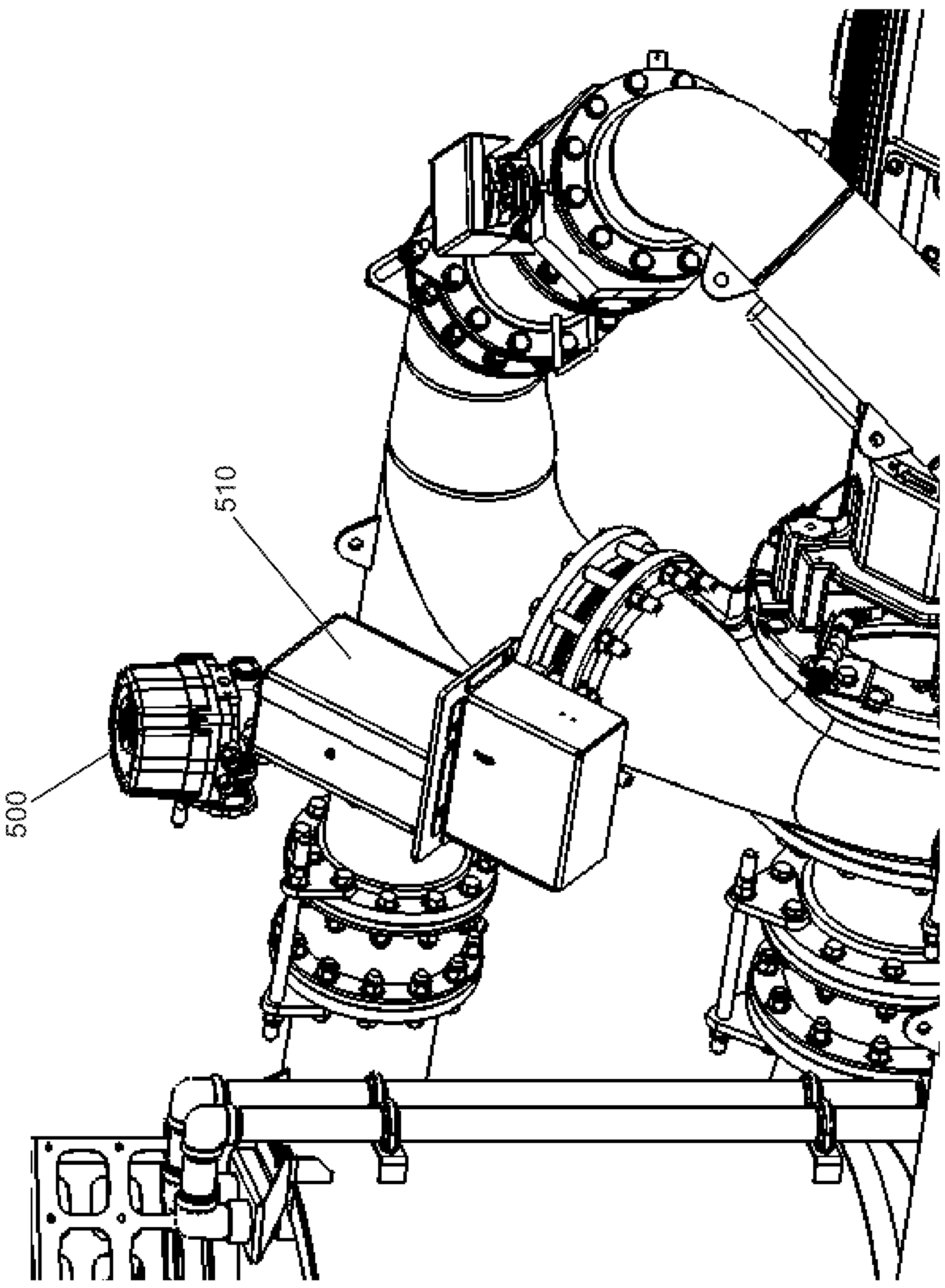
FIG. 5 shows the invention mounted on process piping, according to embodiments of the present invention.

FIG. 5 shows an embodiment 510 the invention mounted on process piping. A conventional rotational valve actuator 500 is visible in the background.

FIG. 6 shows a valve actuator with only one actuator and an adjustable hard stop 11 to inhibit overtravel of the linear actuator 3, lever arm 1 and valve shaft (not shown), according to embodiments of the present invention. A pivoting actuator bracket 4 and housing 2 are also shown.

A notable feature of embodiments of the present invention lies in the layout of the lever arm 1 and actuators 3. In particular, the actuators may be operable to travel within a range of positions lying between a fully retracted position and a fully extended position. For clarity, the fully retracted position and fully extended position may not actually be achievable when the actuators are installed in the apparatus-rather these positions may be defined for the actuators when separate from the apparatus. The valve may be fully opened when the actuators are at a first position between the fully retracted position and the fully extended position (e.g. near but not at the fully extended position). Additionally or alternatively, the valve may be fully closed when the actuators are at a second position between the fully retracted position and the fully extended position (e.g. near but not at the fully retracted position). Accordingly, the possible amount of travel of the actuators exceeds the possible amount or rotational travel of the valve. This design permits advanced controls programming, and synchronization of multiple actuators that may report their locations differently. By extending the actuator strokes beyond the open and closed positions, the actuators can be precisely programmed to follow specific trajectories and speeds, enabling coordinated movement and optimal performance. This feature is particularly advantageous when dealing with complex valve actuation scenarios that demand synchronized and precise control; precise control can be obtained at the expense of actuation speed over the entire actuation range, or specific areas of the actuation where control is more crucial. Soft stops (stops programmed in software, which differ from physical hard stops) can also be programmed and changed easily. For example, a slower actuation speed can be used when nearing a soft stop to precisely position the valve in an open or closed position or otherwise selected position, while a faster actuation speed can be used when away from the soft stop positions to maximise the speed of the valve.

In some embodiments, according to the above arrangement, an actuator may be at least temporarily movable within one or more ranges of extension without affecting the open/closed state of the valve. In particular, the actuator may move within such a range while the valve is fully open, or the actuator may move within such a range while the valve is fully closed, or both. Moreover, it is possible to construct a valve such that the linear actuator can move within such a range while the valve stays at a same amount of partial opening. Then, because of this, a controller can begin moving the actuator prior to a time instant when the valve is required to change its open/closed state. This anticipatory action can be used to overcome time delays for example due to control limitations, inertia, or other actuator limitations. This can improve control timing precision for the valve.

A linear actuator may be able to move within a range while the valve states at a same state, e.g. fully closed, fully open, or partially open, due at least in part to backlash or play in one or more components. Such components may include the linear actuator itself, the actuator bracket, the lever arm, the lever arm actuator shaft, associated bearings or supports, or the like. Limited movements of the linear actuator may take up play or backlash in such components without necessarily changing the valve's state. This "tightens up" the components in anticipation of further movement, which can lead to a faster valve state change at a subsequent time. Therefore, in some embodiments, after the linear actuator moves in a certain direction (e.g. retract or extend) and to a certain position, if it is anticipated that the next move of the linear actuator is to be in the opposite direction (e.g. extend or retract), the linear actuator may move a limited amount in this opposite direction, to facilitate a faster valve change response when the next move is taken. Such a move can be taken immediately, or just before the next move, or at a time when the next move becomes known.

To illustrate, suppose a valve is to begin its switch from open to closed at a particular time T. This may be known for example due to movements being scheduled in advance. The controller may begin to retract the linear actuator(s) from their fully extended position toward their fully retracted position at an earlier time T-dt. The timing and speed of the linear actuator(s) is such that they will pass the (above-mentioned) first position (and continue retracting) at the required time T. Because the actuators are already moving toward the retracted position at time T and do not need to accelerate, the valve may potentially be closed faster. Furthermore, between the times T-dt and T, the controller can adjust the speed of the already-moving linear actuators to more precisely hit the required target of passing the first position at time T.

The range of linear actuator positions that correspond to a same valve fully opened or fully closed state need not be large. For example, a valve may include a seal made of a resilient material such as rubber and be fully closed when this seal covers an aperture. The linear actuator may travel beyond the position at which the seal first contacts and covers the aperture due to compression of the resilient seal material. The range of positions corresponding to tolerable compressions may be small, but it is nonzero. Similarly, valve stops may include surfaces made of resilient material which can be compressed to accommodate a limited amount of overtravel of linear actuators.

Figure 7:
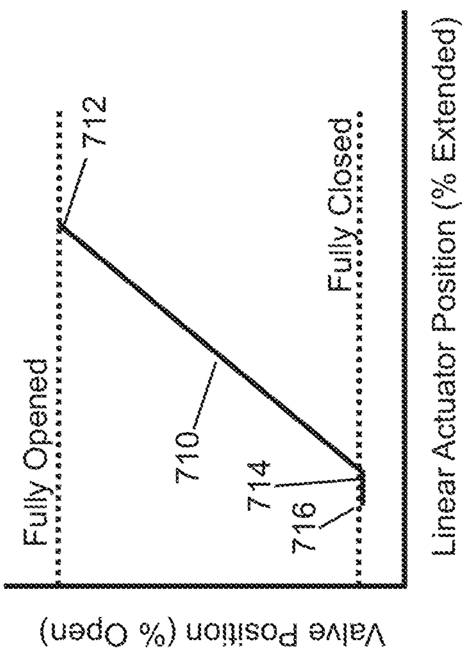
FIG. 7 is a graph illustrating valve position as a function of linear actuator position, according to an embodiment of the present invention.

FIG. 7 illustrates a graph showing valve position 710 as a function of linear actuator position, according to an embodiment. Notably, in this embodiment, the valve is fully opened at point 712 where the linear actuator reaches a certain amount of extension, which may be less than fully extended. The linear actuator may be programmed not to extend beyond point 712, where this point may be adjustable. The valve is fully closed for a range 714 of linear actuator positions. Within this range 714, resilient (e.g. rubber) valve seals are compressed while the linear actuator continues to retract, and thus the valve remains fully closed. Point 716 denotes a point beyond which the linear actuator does not contract. The linear actuator may be programmed not to contract beyond point 716, where this point may be adjustable.

It should be understood that, here and elsewhere, the valve can be rotated toward the open position by extending the linear actuator(s) in in some embodiments, while in other embodiments the valve can be rotated toward the open position by retracting the linear actuator(s). The exact configuration depends on the relative position of the linear actuator(s), the valve and the lever arm shaft, as well as the rotational behaviour of the valve (to open when rotated clockwise or counter-clockwise).

Figure 8:
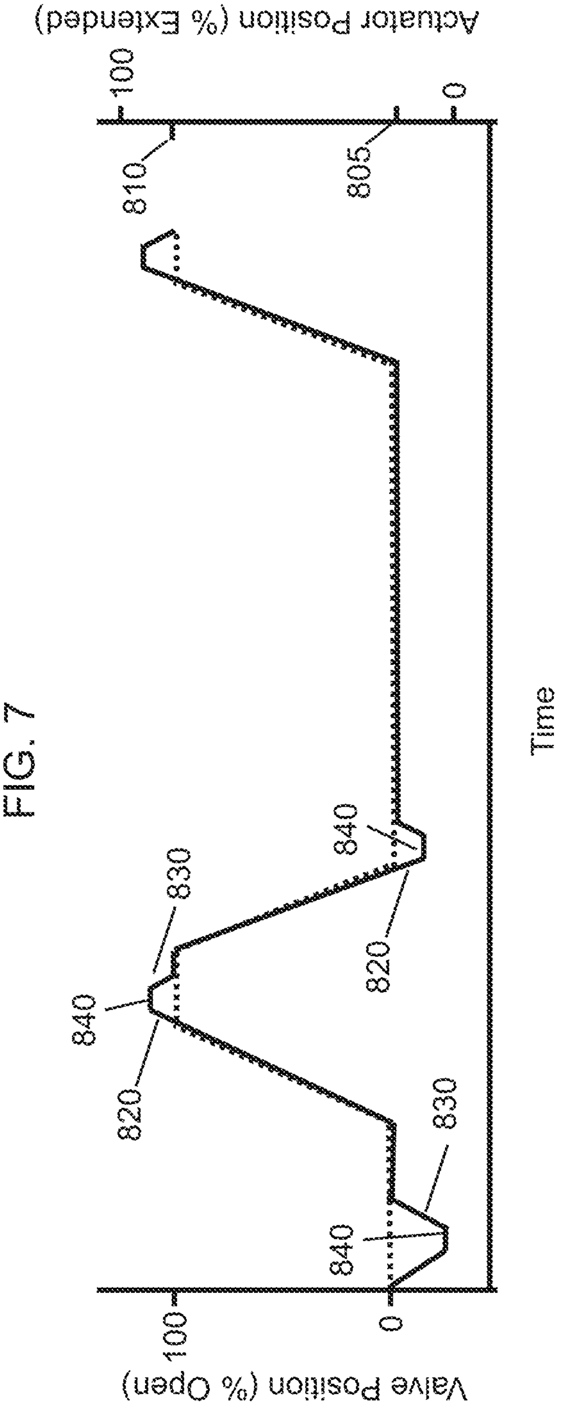
FIG. 8 is a graph illustrating an example of linear actuator operations to open and close a valve, according to an embodiment of the present invention.

FIG. 8 illustrates a graph showing valve position (dashed line) and linear actuator position (solid line) over time, as an illustrative operating example. In this example, the valve generally opens as the linear actuator extends, and generally closes as the linear actuator retracts. Furthermore, the valve is fully closed when the linear actuator is at a first amount of extension 805 which is greater than 0% extended and is fully closed when the linear actuator is at a second amount of extension 810 which is less than 100% extended. Yet further, the linear actuator can temporarily retract beyond the first amount of extension 805, for example while compressing the valve seals. In some embodiments, the linear actuator can temporarily extend beyond the second amount of extension 810.

Features 820 illustrate regions where the linear actuators overshoot following a valve open or valve close operation. This overshoot may be tolerated due to resilient materials such as valve seals or valve stops, or other components, or other mechanical play in the system. Tolerating overshoot allows the valves to be opened or closed more quickly, because the linear actuator is not constrained to stop exactly at positions 805 and 810. It can also make valve opening and closure more reliable. Features 830 illustrate the linear actuators returning to a rest position of extension 805 or 810 following such overshoot, and also following a latency period 840. In the latency period, the linear actuators may remain at a same position, for example due to lash or play within the mechanical components of the overall apparatus, or due to software or electrical delays, or the like, or a combination thereof.

In some embodiments the apparatus is configured so that the valve is fully closed, fully open, or both, when the linear actuator is in a corresponding non-extreme position (i.e. less than fully extended or fully retracted). The linear actuator can be configured e.g. via software to associate these non-extreme positions with corresponding valve-closed or valve-opened positions. Then, due to wear of parts such as rubber seals, the linear actuator positions can be adjusted. Because the linear actuator positions are non-extreme, they can be adjusted in either direction. This allows for more freedom to adjust operations to compensate for wear or other variations, without having to replace components. It also allows for more of the calibration of the apparatus to be done in software rather than via physical configuration. For example, as a valve seal wears out, it requires more rotation of the valve to fully close, and thus more corresponding travel of the linear actuator. By having the initial valve closed position aligning with a non-fully-retracted position of the linear actuator, as the valve seal wears out, the linear actuator can be retracted even further than the initial setpoint in order to close the valve. The adaptation can be done manual or via feedback control or automated recalibration operations.

In some embodiments, as already mentioned above, the linear actuators may temporarily travel beyond their corresponding non-extreme positions during valve closing and/or valve opening, for example to fully seat the valve or valve seal into their fully closed or fully opened position.

Additionally, and in some embodiments, many butterfly valves (or other types of valves) include a rubber seat or seal that have a certain amount of give. Therefore, according to embodiments, it is possible to close the valve disc specifically to shut off all flow, while limiting or minimizing strain and wear on the rubber seat from compressing it more than necessary. Accordingly, in contrast to the above embodiments involving intentional overtravel, some embodiments configure the linear actuators to limit or avoid overtravel in order to preserve valves.

In summary, embodiments of the invention provide a method and apparatus for actuating rotating valves, combining several elements such as the lever arm, housing, pivot, shaft, bearing, front guard, position indicator, rear guard, and stroke layout. Standard and readily available linear actuators can be used, providing cost effective actuation to meet specific design parameters. These components collectively provide for notable speed, precision, and force, for example for facilitating efficient fluid and slurry control. Embodiments of the present invention can be used with various linear actuators, making it suitable for a range of applications and configurations in industries such as hydraulic fracturing, where quick response times, high force capabilities, and compact design are essential.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An actuator for a rotary valve, comprising:

a lever arm coupled to a shaft of the valve at a first location, the shaft being rotatable between a valve closed position and a valve opened position, the lever arm extending from the first location to a second location spaced apart and radially outward, relative to the shaft, from the first location; and one or more linear actuators pivotably coupled to the lever arm at the second location and configured to impart force on the lever arm to cause rotation of the shaft in response to extension, retraction, or both extension and retraction of the one or more linear actuators, the linear actuators extending, in a direction generally perpendicular to the shaft, from the second location to a third location and the linear actuators pivotably anchored to a base or housing at the third location, the base or housing being immobile with respect to the rotary valve;

wherein the one or more linear actuators include a first linear actuator coupled to a first portion of a lever arm actuator shaft, the portion extending upward from the lever arm and a second linear actuator coupled to a second portion of the lever arm actuator shaft, the second portion extending downward from the lever arm.

2. The actuator of claim 1, wherein the first linear actuator is non-rotatably coupled to the first portion of the lever arm actuator shaft, the second linear actuator is non-rotatably coupled to the second portion of the lever arm actuator shaft, and the first portion of the lever arm actuator is integrated with or non-rotatably coupled to the second portion of the lever arm actuator shaft.

3. The actuator of claim 1, wherein at least one of the one or more linear actuators is operable to travel within a limited range between a fully retracted position and a fully extended position, such that one or both of the following hold:

the valve is in the opened position when said at least one of the linear actuators is at a first position between the fully retracted position and the fully extended position; and the valve is in the closed position when said at least one or another at least one of the actuators is at a second position between the fully retracted position and the fully extended position.

4. The actuator of claim 1, wherein a length, shape, or both length and shape of the lever arm is configured to provide a predetermined performance for the actuator, the performance including one or more of: actuator size, torque performance, speed performance, and positioning precision performance.

5. The actuator of claim 4, wherein the lever arm is adjustable in length, shape or both length and shape or replaceable with another lever arm of different length, shape, or both length and shape, in order to adjust performance for the actuator.

6. The actuator of claim 1, further comprising a pivoting actuator bracket holding the one or more linear actuators and being pivotably anchored to the base or housing, the one or more linear actuators being pivotably anchored to the base or housing via the pivoting actuator bracket.

7. The actuator of claim 1, further comprising a lever arm stop which is stationary relative to the base or housing, and which is configured to engage and halt the lever arm when the lever arm reaches a predetermined position effecting the valve closed position or the valve opened position.

* * * * *